(12) United States Patent
Gunlycke (10) Patent No.: US 12,265,832 B2
(45) Date of Patent: Apr. 1, 2025

(54) COMPACT, SYMMETRY-ADAPTED MAPPING BETWEEN FERMIONIC SYSTEMS AND QUANTUM COMPUTERS

(71) Applicant: The Government of the United States of America, as represented by the Secretary of the Navy, Arlington, VA (US)

(72) Inventor: Lennart D. Gunlycke, Alexandria, VA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 60 days.

(21) Appl. No.: 17/184,516

(22) Filed: Feb. 24, 2021

(65) Prior Publication Data

US 2021/0263753 A1   Aug. 26, 2021

Related U.S. Application Data

(60) Provisional application No. 62/980,556, filed on Feb. 24, 2020.

(51) Int. Cl.
  *G06F 9/44*   (2018.01)
  *G06F 9/445*  (2018.01)
  *G06N 10/20*  (2022.01)

(52) U.S. Cl.
  CPC ........ *G06F 9/44505* (2013.01); *G06N 10/20* (2022.01)

(58) Field of Classification Search
  CPC ................. G06F 1/32; G06F 9/44; G06F 1/12
  See application file for complete search history.

(56) References Cited

U.S. PATENT DOCUMENTS

| | | | |
|---|---|---|---|
| 2012/0149581 A1* | 6/2012 | Fang | A61K 41/0004 977/932 |
| 2014/0207723 A1* | 7/2014 | Alboszta | B82Y 10/00 706/46 |
| 2017/0351601 A1* | 12/2017 | Matsuzawa | G06F 12/0238 |
| 2018/0053112 A1* | 2/2018 | Bravyi | G06F 30/392 |
| 2020/0313037 A1* | 10/2020 | He | C09K 11/883 |
| 2020/0372094 A1* | 11/2020 | Shehab | G06F 17/11 |
| 2022/0029639 A1* | 1/2022 | McClean | G06N 10/60 |

* cited by examiner

*Primary Examiner* — Keshab R Pandey (74) *Attorney, Agent, or Firm* — US Naval Research Laboratory; William P. Ladd (57) ABSTRACT

Systems and methods are provided for mapping arbitrary isolated quantum-mechanical systems to quantum processor registers on quantum computers that use available symmetry to maximize compactness. For example, embodiments of the present disclosure exploit existing symmetries in the simulated system to minimize the required number of quantum bits (qubits) in the quantum processor.

20 Claims, 6 Drawing Sheets

COMPACT, SYMMETRY-ADAPTED MAPPING BETWEEN FERMIONIC SYSTEMS AND QUANTUM COMPUTERS

CROSS REFERENCE TO RELATED APPLICATIONS

This application claims the benefit of U.S. Provisional Patent Application No. 62/980,556, filed on Feb. 24, 2020, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, D.C. 20375, USA; +1.202.767.7230; techtran@nrl.navy.mil, referencing Navy Case Number 110465-US3.

FIELD OF THE DISCLOSURE

This disclosure relates to quantum computing, including the mapping of quantum-mechanical systems to quantum registers.

BACKGROUND

Quantum computing has the potential to significantly speed up complex computational tasks. One promising application area for quantum computing is the simulation of quantum-mechanical systems.

For a quantum-mechanical system to be simulated on a quantum computer, one needs a mapping that transforms the quantum states of the system to states within a computational space within the Hilbert space of a quantum register. A quantum register is a collection of quantum bits (qubits) within the quantum computer that can be manipulated by means of quantum gate operations.

One challenge is that quantum computing resources, despite recent progress in quantum computing hardware technology, are expected to be limited in the foreseeable future. Therefore, mappings that reduce the required resources are expected to allow for larger systems to be simulated.

Prior mappings do not make the most efficient use of existing resources. Mappings that are defined independently of the simulated system cannot fully exploit the symmetry of the system to minimize the computational space, and as a result, these mappings generally require additional resources. Mappings that exploit $Z_2$ symmetries, which are compatible with qubit symmetry, have been proposed. These mappings however, cannot account for other symmetries present in the system.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Fermions are particles that obey the Pauli exclusion principle and follow Fermi-Dirac statistics. They generally have half odd integer spin, such as 1/2, 3/2, etc. Fermions include quarks, leptons, and composite particles made of an odd number of quarks and leptons. Fermions have conserved baryon or lepton quantum numbers. Due to the Pauli exclusion principle, only one fermion can occupy a quantum state at a certain time. If more than one fermion has the same spatial probability distribution, then at least one property of each fermion (e.g., spin) must be different.

In an embodiment, to understand the evolution of an isolated, non-relativistic fermionic system, a quantum mechanical equation of motion, such as the Schrodinger equation, can be solved:

$$i\hbar \frac{\partial}{\partial t} |\Psi(t)\rangle = \hat{H} |\Psi(t)\rangle, \tag{1}$$

where h is the reduced Planck constant and $|\Psi(t)\rangle$ is the quantum mechanical state at time t of the system described by the Hamiltonian $\hat{H}$. In an embodiment, before the equation of motion is solved, a basis $\{|\phi_i\rangle\}$ including of a set of basis states $|0\rangle$ is specified and can be used to represent quantum states:

$$|\Psi(t)\rangle = \sum_i |\Phi_i\rangle \langle \Phi_i | \Psi(t) \rangle \tag{2}$$

in terms of a set of complex basis coordinates $\langle \phi_i | \Psi(t) \rangle \in \mathbb{C}$. A challenge is that the number of basis states and coordinates grows exponentially with system size, which, with the exception of a few small systems, makes it impossible to solve the equation of motion exactly within numerical accuracy using classical computing. Even with brute force, the largest supercomputers are limited to systems of about 25 electrons.

A quantum computer, unlike a classical computer, is able to efficiently simulate quantum-mechanical systems, including second-quantized many-particle fermionic systems, using resources that scale at most polynomially with system size. In other words, quantum computing can offer an advantage over classical computing, which require an exponential amount of resources to perform the corresponding many-particle quantum-mechanical simulations.

In an embodiment, quantum simulations on quantum computers use a map between the states of a physical system (the target) and the states of a quantum computer (the simulator). Because quantum computing resources, despite recent progress, will be limited in the foreseeable future, embodiments of the present disclosure look for compact basis representations, which require the fewest number of quantum bits (qubits) in quantum computers. Embodiments of the present disclosure present systems and methods for constructing a minimal basis representation and a map for an arbitrary isolated, non-relativistic fermionic system.

Embodiments of the present disclosure provide systems and methods for mapping arbitrary isolated quantum-mechanical systems to quantum processor registers on quantum computers that use available symmetry to maximize compactness. For example, embodiments of the present disclosure exploit all existing symmetries in the simulated system to minimize the required number of qubits in the quantum processor.

Embodiments of the present disclosure reduce quantum computer resource requirements, improve convergence, and lessen the impact of noise in a quantum computer. Systems and methods in accordance with embodiments of the present disclosure have several advantages over prior techniques, including requiring fewer qubits for quantum simulation, smaller Hilbert spaces for the trial states in a quantum variational method, fewer trial-state optimization parameters, smaller optimization gate depths, fewer quantum gate operations, increases in energy excitation gap, improved ground-state convergence, enabling the calculation of excited states, and elimination of noise in the quantum computing calculations associated with coupling to states prohibited by symmetry.

2. Symmetry Configuration Mapping

In an embodiment, quantum simulations can be used to simulate the dynamics of a physical system, such as a closed quantum-mechanical system, on a quantum register. In an embodiment, a closed quantum-mechanical system is a quantum-mechanical system that cannot exchange particles with an outside environment (i.e., the number of particles within the system is conserved). For example, in an embodiment, a closed quantum-mechanical system is a closed chemical system. In an embodiment, each physical system to be simulated on a quantum computer uses a map, and, to produce such maps, a mapping (between the quantum-mechanical system and the quantum register) is used.

In some mappings, the entire many-particle (Hilbert) space of a (fermionic) physical system is mapped to the computational (Hilbert) space of the quantum register. Because the entire many-particle (Hilbert) space must fit into the computational (Hilbert) space, these mappings require a certain number Q qubits in the quantum register. Embodiments of the present disclosure can produce more compact maps requiring fewer qubits (i.e., Q is minimized).

Embodiments of the present disclosure can identify smaller symmetry-invariant subspaces of the many-particle (Hilbert) space of a system and map these subspaces, rather than the full many-particle space, to the computational space of a quantum register. Embodiments of the present disclosure use a symmetry configuration mapping (SCM) method to generate mappings and/or maps. Because the symmetry-invariant subspaces are smaller than the original many-particle space, a SCM in accordance with an embodiment of the present disclosure requires fewer qubits.

2.1. Exemplary Systems

Figure 1:
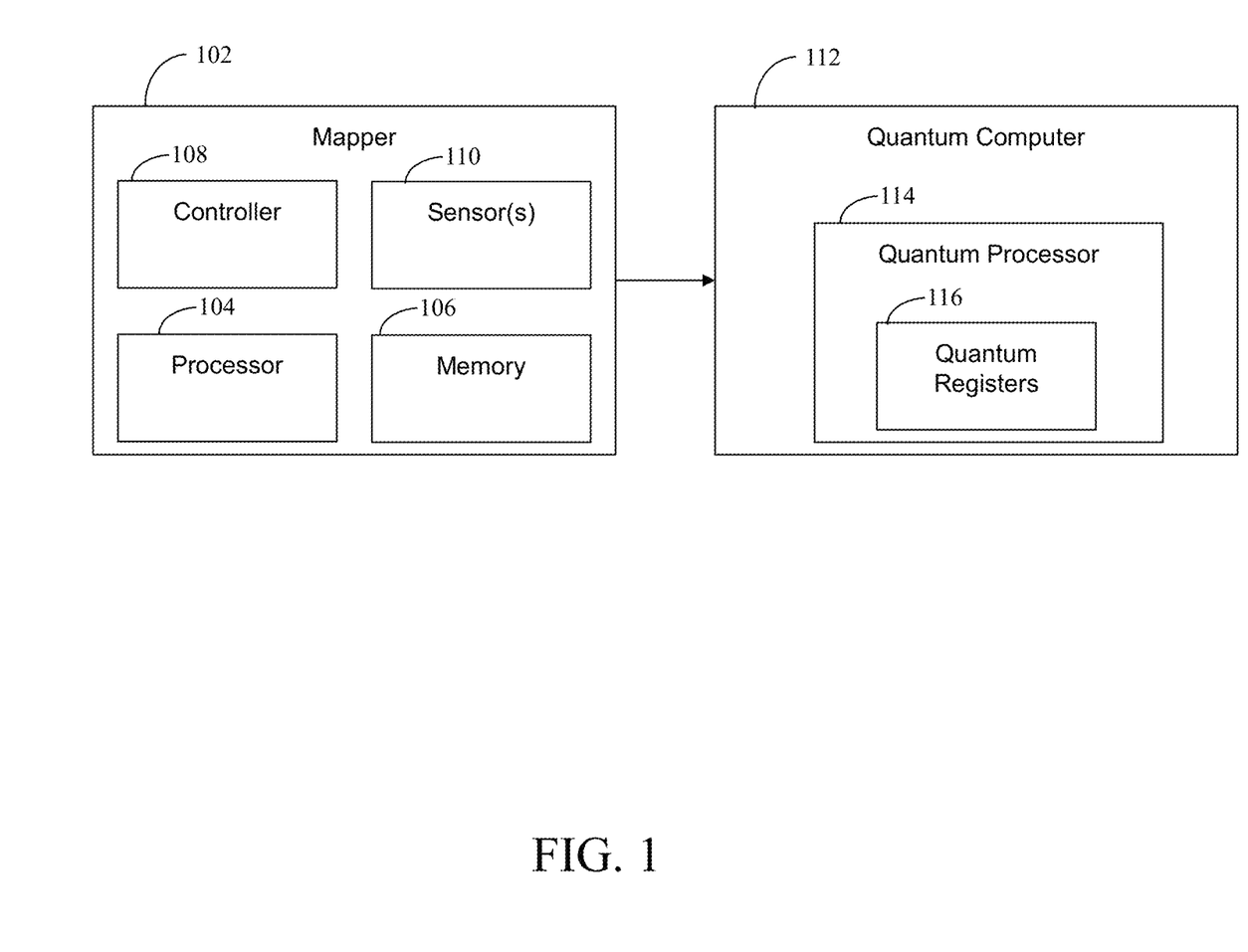
FIG. 1 is a diagram representing an exemplary system for mapping a closed quantum-mechanical system to registers of a quantum processor in accordance with an embodiment of the present disclosure.

FIG. 1 is a diagram representing an exemplary system for mapping a closed quantum-mechanical system to registers of a quantum processor in accordance with an embodiment of the present disclosure. In FIG. 1, a mapper 102 (e.g., in an embodiment, a mapping device) in accordance with an embodiment of the present disclosure has a processor 104, a memory 106, and a controller 108. In an embodiment, mapper 102 is configured to map a closed quantum-mechanical system to registers of quantum computer, such as quantum computer 112. In an embodiment, quantum computer 112 includes a quantum processor 114, and quantum processor 114 includes a plurality of quantum registers 116. In an embodiment, each quantum register in the plurality of quantum registers 116 is configured to hold a plurality of quantum bits (qubits). In an embodiment, each qubit can be configured to hold a quantum state that is a superposition of two basis states (e.g., $|0\rangle$ or $|1\rangle$). In an embodiment, mapper 102 is configured to construct a complete set of many-particle symmetry configuration basis states for a closed quantum-mechanical system and associate these basis states with the basis states (e.g., $|000\rangle$, $|001\rangle$, $|010\rangle$, $|011\rangle$, $|100\rangle$, ...) of a quantum register in the plurality of quantum registers 116. Further, mapper 102 is configured to use this mapping to compute the non-zero matrix elements of the quantum mechanical observable of interest in the simulation.

In an embodiment, mapper 102 determines composition information based on a quantum-mechanical system (e.g., a closed quantum-mechanical system). Mapper 102 can determine the composition of quantum-mechanical systems, such as closed quantum-mechanical systems, in a variety of different ways in accordance with embodiments of the present disclosure. For example, in an embodiment, mapper 102 can include one or more sensor(s) 110 to determine particle composition and symmetry configuration information of a closed quantum-mechanical system. For example, in an embodiment, mapper 102 can be configured to receive (and/or detect) a physical sample (e.g., via a physical sample receiver integrated into mapper 102). For example, in an embodiment, the physical sample is a chemical sample. In an embodiment, sensor(s) 110 can be configured to detect particles in the sample and determine particle composition and symmetry configuration information from the sample (e.g., in an embodiment, the chemical composition of molecules and their symmetries).

In an embodiment, mapper 102 does not include sensor(s) 110. For example, in an embodiment, mapper 102 can receive particle composition and symmetry configuration information of a physical sample instead of detecting it via sensor(s) 110. For example, in an embodiment, a physical sample can be sensed and/or scanned using another device, and the particle composition and symmetry configuration information of the sample can be sent to mapper 102 (e.g., to controller 108). In an embodiment, the particle composition and symmetry configuration information can be generated, rather than sensed and/or detected, and send to mapper 102. For example, in an embodiment, a user can manually enter the particle composition and symmetry configuration information. In an embodiment, a device, such as a computer, can be configured to generate the particle composition and symmetry configuration information (e.g., based on a predetermined algorithm).

The particle composition information can include information regarding a quantum-mechanical system, a chemical system, or a molecular system in accordance with embodiments of the present disclosure. In an embodiment, the particle composition information can contain information regarding every molecule in a chemical sample. In an embodiment, the particle composition information can contain information regarding the most common molecules present in a chemical sample. For example, in an embodiment, the particle composition information can include information for every molecule type that makes up a portion of the chemical sample above a predetermined threshold.

In an embodiment, once mapper 102 determines the particle composition information (e.g., in an embodiment, using controller 108), mapper 102 determines (e.g., in an embodiment, using controller 108) a quantum-mechanical system representation of the particle composition information. In an embodiment, mapper 102 can then determine (e.g., in an embodiment, using controller 108) a symmetry-adapted representation of the quantum-mechanical system information. In an embodiment, mapper 102 can then determine (e.g., in an embodiment, using controller 108) a quantum processor representation of the symmetry-adapted representation. In an embodiment, mapper 102 can then map the quantum processor representation onto quantum registers of a quantum computer (e.g., in an embodiment onto quantum registers 116 of quantum processor 114 of quantum computer 112).

In an embodiment, mapper 102 can be configured to send a signal to quantum computer 112 that instructs quantum computer 112 to change the values in quantum registers 116. In an embodiment, mapper 102 can be configured to output the quantum processor representation. In an embodiment, the quantum processor output can be sent back (e.g., over a wired connection, over a wireless connection, and/or over a network) to mapper 102 for data processing. In an embodiment, the quantum processor output can be stored (e.g., in a memory, such as memory 106) for later use.

Elements of mapper 102 can be implemented using hardware, software, and/or a combination of hardware and software in accordance with embodiments of the present disclosure. For example, in an embodiment, controller 108 is implemented using an algorithm executing on a host computer, and processor 104 and memory 106 are part of the hardware of the host computer. The host computer can be a general purpose computer or a special purpose computer for mapping a closed quantum-mechanical system to registers of a quantum processor in accordance with an embodiment of the present disclosure. In an embodiment, mapper 102 is implemented as a special purpose device for performing a closed quantum-mechanical system to registers of a quantum processor, and memory 106 and processor 104 are integrated into mapper 102. Elements of mapper 102 can be implemented using a single device or multiple devices in accordance with embodiments of the present disclosure.

2.2. Exemplary Methods

In an embodiment, the dynamics of a physical system $\Upsilon$ are simulated on a quantum register Q. In an embodiment, physical system $\Upsilon$ has a full dynamical group $G_\Upsilon$, and quantum register Q has a full dynamical group $G_Q$. In an embodiment, the Hilbet space $\mathcal{H}_\Upsilon$ is complex and separable, and the Hilbert space $\mathcal{H}_Q$ is complex and finite-dimensional.

In an embodiment, for the mapping $\mathcal{H}_\Upsilon \to \mathcal{H}_Q$, the injection $\dim \mathcal{H}_\Upsilon \leq \dim \mathcal{H}_Q$ is used to faithfully represent $G_\Upsilon$. The quantum register Hilbert space dimension can be represented by $\dim \mathcal{H}_Q = 2^Q$, and the required number of qubits in the quantum register can be represented by $Q = \lceil \log_2 \dim \mathcal{H}_\Upsilon \rceil$. In an embodiment, symmetry-invariant subspaces $\mathcal{H}^\Sigma \subset \mathcal{H}_\Upsilon$ are identified, and subspaces are mapped, using SCM, such that $\mathcal{H}^\Sigma \to \mathcal{H}_Q$. In an embodiment, a qubit requirement can be represented by $Q = \lceil \log_2 \dim \mathcal{H}^\Sigma \rceil$.

In an embodiment, a symmetry group $G_{sym}$ is a group of all symmetry operations, and each symmetry operation $g \in G_{sym}$ can be represented by a unitary operator $\hat{U}g$. In an embodiment, a commutation property $[\hat{H}_\Upsilon, \hat{U}_g] = 0$ for all $g \in G_{sym}$. In an embodiment, for any $g \in G_{sym}$, $\hat{H}_\Upsilon$ and $\hat{U}g$ have simultaneous eigenstates. In an embodiment, for non-Abelian groups, fig, $\exists g, g' \in G_{sym}$ such that $[\hat{U}_g, \hat{U}_{g'}] \neq 0$.

In an embodiment, a set of commuting operators comprising the Hamiltonian (describing the system) and operators constructed from the symmetry operators of the symmetry group of the system are found. For example, in an embodiment, a set of commuting operators $\{\hat{A}_i\}_{i \in \mathcal{I}}$ is found such that $[\hat{H}_\Upsilon, \hat{A}_i] = 0$, $[\hat{A}_i, \hat{A}_{i'}] = 0$, and $\forall i, i' \in \mathcal{I}$. In an embodiment, for continuous $G_{sym}$, $\{\hat{A}_i\}_{i \in \mathcal{I}}$ is composed of Casmir operators. In an embodiment, for discrete $G_{sym}$, $\{\hat{A}_i\}_{i \in \mathcal{I}}$ is composed of equivalence class operators. In an embodiment, there exists states that are simultaneous eigenstates of $\hat{H}_\Upsilon$ and all $\hat{A}_i$.

In an embodiment, each ordered set of eigenvalues of $\hat{A}_i$ forms a symmetry configuration. A symmetry configuration is a specification of the symmetry of a particular state of the system. In an embodiment, the general interest is in the lowest energy state of the system—the ground state. The symmetry configuration for the ground state can generally be known a priori from experiment and/or classical computations. In an embodiment, the symmetry configuration of interest for a system can be considered as input to a method in accordance with an embodiment of the present disclosure.

In an embodiment, for each given symmetry configuration, a basis of orthonormal many-particle configuration states can be constructed such that each state in this basis is also an eigenstate of all $\hat{A}_i$. In an embodiment, the existence of such a basis is guaranteed for every set of commuting operators $\hat{A}_i$.

In an embodiment, the constructed basis is a subset of a larger SCM basis. In an embodiment, the constructed basis is, for the symmetry-invariant subspace, associated with the input symmetry configuration, and the SCM basis is for the full many-particle Hilbert space. In an embodiment, these bases are needed to describe states in their respective spaces. This is analogous to needing a set of axes to describe positions in the normal three-dimensional Euclidean position space.

In an embodiment, in the SCM basis, the Hamiltonian decomposes into smaller parts. In a matrix representation, this decomposition corresponds to a matrix being block diagonal. In an embodiment, each smaller part (or block in the matrix representation) is the description of the system on the symmetry-invariant subspace of a unique symmetry configuration. In an embodiment, because we already know which symmetry configuration is of interest to us (given by method input), we know a symmetry-invariant subspace to focus on. In an embodiment, by symmetry, the system cannot couple states in this symmetry-invariant subspace to states in another symmetry-invariant subspace. Therefore, in an embodiment, all the symmetry-invariant subspaces, except the one we are interested in, are irrelevant to finding or simulating the evolution of a particular state of the system.

In an embodiment, using the constructed basis for the symmetry-invariant subspace of interest, the Hamiltonian matrix elements (which are the matrix elements of a smaller decomposed part of the full original Hamiltonian in the SCM basis) can then be computed. In an embodiment, from these Hamiltonian matrix elements, a set of Pauli coordinates can be calculated. In an embodiment, the set of these Pauli coordinates is a representation of the Hamiltonian describing the physical system on the computational Hilbert space. In other words, in an embodiment, the SCM has provided a map between the physical space and the quantum register. In an embodiment, manipulations of the quantum register using quantum logic gates now corresponds to actions of the physical system. In an embodiment, with this correspondence, a physical system can be simulated using quantum algorithms and circuits.

For example, in an embodiment, a basis $\{|\Psi_l^\Sigma\rangle\}$ of orthogonal configuration states that are simultaneous eigenstates of all $\hat{A}_i$ is constructed. In an embodiment, each symmetry configuration $\Sigma = (a_i)_{i \in \mathcal{I}}$ is an ordered set of eigenvalues $a_i$ associated with $\hat{A}_i$. In an embodiment, the basis states are, for each $\Sigma$, indexed by $l \in \Lambda^\Sigma$. In an embodiment, these states span the symmetry-invariant subspaces $\mathcal{H}^\Sigma \subset \mathcal{H}_\Upsilon$. In an embodiment, in this basis, the Hamiltonian decomposes as:

$$\hat{H}_\Upsilon = \bigoplus_\Sigma \hat{H}^\Sigma \qquad (3)$$

In an embodiment, because $\hat{H}_\Upsilon$ on different symmetry-invariant subspaces is decoupled, the eigenstates of $\hat{H}_\Upsilon$ for a given are contained entirely within $\mathcal{H}^\Sigma$. In an embodiment, as $\dim \mathcal{H}^\Sigma = |\kappa^\Sigma|$, the qubit requirement to find these eigenstates is $Q = \lceil \log_2 |\kappa^\Sigma| \rceil$.

In an embodiment, for $\Sigma$ provide a priori, the $\hat{H}^\Sigma$ matrix element can be calculated to form matrix $H^\Sigma(|\kappa^\Sigma|, \mathbb{C})$. In an embodiment, an $\mathcal{H}^\Sigma \to \mathcal{H}_Q$ mapping can then be performed. In an embodiment, Pauli coordinates can be generated for the quantum register Hamiltonian $\hat{H}_Q$ using $H^\Sigma(|\kappa^\Sigma|, \mathbb{C})$ as input.

In an embodiment, types of symmetry groups present in all closed chemical systems include the global phase shift symmetry group, a symmetric group, an orbital point group, and a spin group. In an embodiment, the full symmetry group of a particular system is a direct product of one symmetry group from each of the mentioned types. In an embodiment, each of these component symmetry groups produces a set of quantum numbers upon eigenvalue decomposition of their symmetry operators A mentioned above.

In an embodiment, for closed chemical systems, a symmetry configuration is an ordered set that in an embodiment contains (in order) the total number of particles N, an irreducible representation label $\Gamma$, degeneracy index $M_\Gamma$ for an orbital point group, the total spin S, and the degeneracy index $S_z$ for a spin group. In an embodiment, each set of quantum numbers produced by the symmetry group is a symmetry configuration $\Sigma = (N, \Gamma, M_\Gamma, S, S_z)$.

Table 1 shows the qubit requirement for the ground state of molecular fluorine ($F_2$) for full symmetry groups successively including more symmetry groups. In Table, 1, "None" corresponds to a general mapping with only the symmetric group applied. In Table 1, "N" is a compact mapping that also accounts for global phase shift symmetry. In Table 1, the last row accounts for the full symmetry group. In Table 1, "Configurations" refers to the number of many-particle symmetry configuration basis states that are constructed using an SCM method for various levels of symmetry, and "Quantum Bits" is the number of quantum bits required in the quantum register in accordance with an embodiment of the present disclosure:

TABLE 1

| Constraints | Configurations | Quantum Bits |
|---|---|---|
| None | 65536 | 16 |
| N | 120 | 7 |
| N, $S_z$ | 64 | 6 |
| N, $S_z$, $\Gamma$ | 12 | 4 |
| N, S, $S_z$, $\Gamma$ | 10 | 4 |

In Table 1, the configuration numbers are the sizes (dimensions to be exact) of the subspaces of interest as different symmetry group types are included. In an embodiment, for a molecular fluorine system, the original many-particle Hilbert space has dimension 65,536. In an embodiment, we constructed a symmetry-invariant subspace, which for the symmetry configuration for the ground state of the system, has dimension only 12. While the former space requires 16 qubits to be mapped to a computational space, using an SCM method and focusing on the pertinent symmetry configuration, a symmetry-invariant subspace was produced that only requires 4 qubits.

Figure 2:
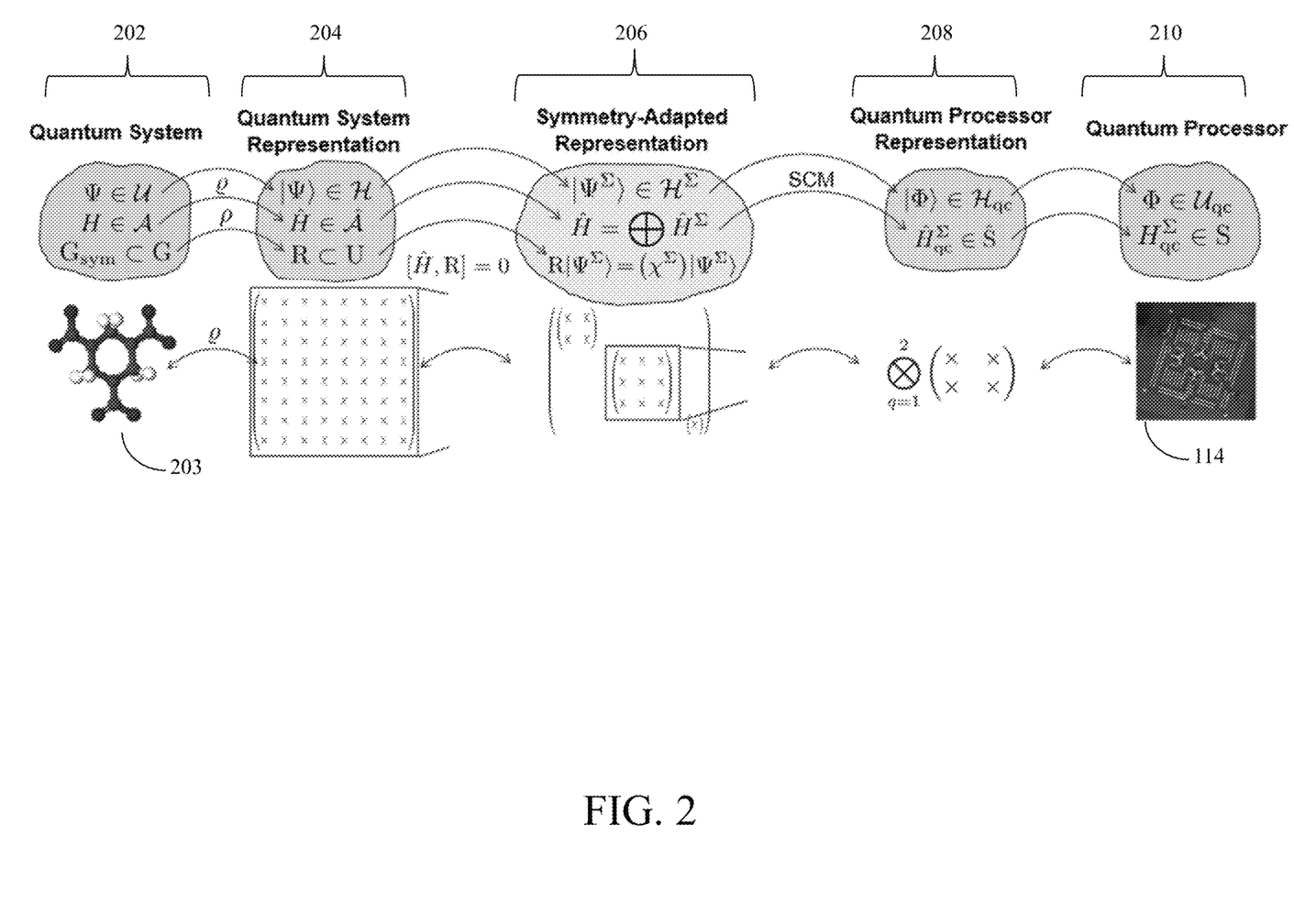
FIG. 2 is a diagram illustrating how closed quantum-mechanical systems are mapped to a quantum register of a quantum processor in accordance with an embodiment of the present disclosure.

FIG. 2 is a diagram illustrating how closed quantum-mechanical systems are mapped to a quantum register of a quantum processor in accordance with an embodiment of the present disclosure. In step 202, the composition of a quantum-mechanical system (e.g., a closed quantum-mechanical system) is determined. For example, in an embodiment, particle composition information of a physical sample is determined (e.g., by controller 108 of mapper 102). For example, FIG. 2 shows an image representing a chemical molecule 203. In an embodiment, mapper 102 can determine and/or receive chemical compound information of molecule 203. In an embodiment, for a quantum-mechanical system, $\Psi \in \mathcal{U}$ describes its state in the universe of states. In an embodiment, for the quantum-mechanical system, $H \in \mathcal{H}_\Upsilon$ is the total energy observable in the set of observables. In an embodiment, for the quantum-mechanical system, $G_{sym} \subset G$ is the full symmetry group, which is a subset of the full dynamical group of all transformations of the system.

In step 204, a quantum-mechanical system representation of the quantum-mechanical system is determined. For example, in an embodiment, controller 108 can generate a quantum-mechanical system representation of the quantum-mechanical system determined in step 202. In an embodiment, in the quantum-mechanical system representation, $|\Psi\rangle \in \mathcal{H}$ is the image of the physical state on a finite-dimensional Hilbert space $\mathcal{H}$ for the system. In an embodiment, $\hat{H} \in \hat{A}$ is the Hamiltonian, and $R \subset U$, where $[\hat{H}, R]=0$ is the unitary representation of the full symmetry group on the Hilbert space. In an embodiment, $|\Psi(t)\rangle$ is the quantum mechanical state at time t of the system described by the Hamiltonian $\hat{H}$. In an embodiment, $(\mathcal{H}, \rho)$ is a unitary representation of G given by the group homomorphism $\rho: G \to U(\mathcal{H})$. In an embodiment, inter- and intra-particle subspaces uncoupled by dynamical transformations are identified so that representation of the full dynamical group decomposes as a direct product into representations of dynamical groups $U_l$ associated with the these subspaces, as given by $$U \supset \bigotimes_l U_l. \quad (4)$$

In step 206, a symmetry-adapted representation of the quantum-mechanical system representation is determined. For example, in an embodiment, controller 108 can generate a symmetry-adapted representation of the quantum-mechanical system representation determined in step 204. In an embodiment, in the symmetry-adapted representation, $|\Psi^\Sigma\rangle \in H^\Sigma$, $\hat{H} = \oplus \hat{H}^\Sigma$, and $R|\Psi^\Sigma\rangle = (x^\Sigma)|\Psi^\Sigma\rangle$. For example, in an embodiment, a set of commuting operators comprising the Hamiltonian (describing the system) and operators constructed from the symmetry operators of the symmetry group of the system are found. For example, in an embodiment, a set of commuting operators $\{\hat{A}_i\}_{i \in \mathcal{I}}$ is found such that $\hat{H}_\Upsilon$, $\hat{A}_i]=0$, $[\hat{A}_i, \hat{A}_{i'}]=0$, and $\forall i, i' \in \mathcal{I}$. In an embodiment, a basis $\{|\Psi_i^\Sigma\rangle\}$ of orthogonal configuration states that are simultaneous eigenstates of all $\hat{A}_i$ is constructed. In an embodiment, each symmetry configuration $\Sigma = (a_i)_{i \in \mathcal{I}}$ is an ordered set of eigenvalues $a_i$ associated with $\hat{A}_i$. In an embodiment, the basis states are, for each $\Sigma$, indexed by $l \in \Lambda^\Sigma$. In an embodiment, these states span the symmetry-invariant subspaces $\mathcal{H}^\Sigma \subset \mathcal{H}_\Upsilon$. In an embodiment, in this basis, the Hamiltonian decomposes as shown by Equation (3) above.

In step 208, a quantum processor representation of the symmetry-adapted representation is determined. For example, in an embodiment, controller 108 can generate a quantum processor representation of the symmetry-adapted representation in step 206. In an embodiment, $|\Phi\rangle \in H_{qc}$, is a quantum state of the computational Hilbert space of a quantum register in the plurality of quantum registers 116 and $H_{qc}^\Sigma$, $\Sigma \hat{S}$ is the representation of the Hamiltonian for the selected symmetry configuration on this computational Hilbert space.

Step 210 illustrates the existence of a correspondence between the quantum states $|\Phi\rangle \in H_{qc}$ in the abstract computational Hilbert space and the physical states $\Phi \in U_{qc}$ of some implementation of the quantum processor. There is also a representation of the Hamiltonian $H_{qc}^\Sigma \in \hat{S}$ on the universe of states of quantum processor 114. In an embodiment, the implementation-dependent correspondence is not covered by mapper 102, which is designed to work with an arbitrary quantum computer 112.

Together, in an embodiment, controller 108 can map each state of a quantum-mechanical system 202 to a state of a quantum register in the plurality of quantum registers 116 within quantum processor 114. In an embodiment, output from quantum processor 114 can then be sent back to mapper 102 and processed in processor 104 or stored in memory 106 for later use.

3. Exemplary Embodiments

Exemplary embodiments of SCM will now be discussed in further detail. Embodiments of the present disclosure construct customized mappings tailored to quantum mechanical systems. Specifically, embodiments of the present disclosure take advantage of existing symmetry, which we build into the mappings a priori to obtain optimal compactness. To demonstrate this approach, embodiments of the present disclosure have performed quantum computing calculations of the fluorine molecule, in which we have mapped 16 active spin-orbitals to 4 qubits. This is a four-fold reduction in the qubit requirement, as compared to the standard general mappings. Moreover, compact system-to-qubits mappings in accordance with an embodiment of the present disclosure are robust against noise that breaks symmetry, thereby reducing non-statistical errors in the computations. Furthermore, many systems, including $F_2$, are described by real Hamiltonians, allowing us to also reduce the number of single-qubit operations in the hardware-efficient ansatz for the quantum variational eigensolver by roughly a factor of three.

In an embodiment, to understand the behavior of an isolated, non-relativistic system, we solve a quantum mechanical equation of motion such as the Schrödinger equation of Equation (1), which is reproduced below:

$$i\hbar \frac{\partial}{\partial t} |\Psi(t)\rangle = \hat{H} |\Psi(t)\rangle, \quad (1)$$

where $\hat{H}$ is the Hamiltonian describing the system and $|\Psi(t)\rangle$ is the quantum state at time t. While finding the exact solution is with few exceptions computationally hard on classical computers, Equation (1) can be solved efficiently on quantum computers.

Current research directed towards using quantum computers to solve quantum mechanical problems has mostly focused on a second-quantized description that uses an occupation number representation to describe quantum states and the Jordan-Wigner (JW) transformation to represent the dynamics of the system on a quantum computer. While mapping the Fock space onto the Hilbert space of a quantum register comprised of qubits has the advantage of known and efficient transformations, it is not the most efficient mapping in terms of the number of qubits needed for many problems of interest. Efficient mappings are particularly important for the current generation of quantum computers that demand the efficient use of limited quantum resources.

Herein, we apply a symmetry configuration mapping (SCM) method in accordance with an embodiment of the present disclosure, which begins by constructing a complete set of symmetry-adapted many-particle basis states $\{|\Phi_\ell^\Sigma\rangle\}$, which we refer to as symmetry configuration basis states, where $\Sigma$ denotes symmetry configurations and $\ell$ enumerates symmetry-equivalent basis states. In the symmetry configuration basis, the Hamiltonian of the system can be expressed as the direct sum $$\hat{H} = \bigoplus_\Sigma \hat{H}^\Sigma, \quad (5)$$

where $\hat{H}^\Sigma$ are symmetry configuration Hamiltonians of rank $\Lambda^\Sigma$. This decomposition allows us to solve the eigenvalue equation $$\hat{H}^\Sigma |\Psi_\lambda^\Sigma\rangle = E_\lambda^\Sigma |\Psi_\lambda^\Sigma\rangle \quad (6)$$

independently for each symmetry configuration $\Sigma$, where $|\Psi_\lambda^\Sigma\rangle$ are eigenstates with energies $E_\lambda^\Sigma$. Moreover, we often need to consider only a subset of symmetry configurations that are known a priori from, e.g., spectroscopic data or classical calculations. For ground-state properties in particular of a system with known symmetry, we only need to solve Equation (6) for a single symmetry configuration.

Using the symmetry configuration basis in the SCM method outlined above, we can represent the symmetry configuration Hamiltonians on the Hilbert space of the quantum register as linear combinations of tensor products of Pauli operators:

$$\hat{H}^\Sigma = \sum_{(r_q)} c_{(r_q)} \hat{\sigma}_{r_1} \otimes \hat{\sigma}_{r_2} \otimes \ldots \otimes \hat{\sigma}_{r_Q}, \quad (7)$$

where $(r_q)$ are indexed families over all qubits $q \in \{1, 2, \ldots, Q^\Sigma\}$ with each $r_q \in \{0, x, y, z\}$, $\hat{\sigma}_0$ is the identity operator, and $\hat{\sigma}_x$, $\hat{\sigma}_y$, $\hat{\sigma}_z$ are Pauli operators. For any given $\Sigma$, the number of qubits required to map our symmetry configuration basis states $|\Phi_\ell^\Sigma\rangle$ to the basis states of our quantum register is $$Q^\Sigma = \lceil \log_2 \Lambda^\Sigma \rceil, \quad (8)$$

which can be substantially less than in other mappings. See Table (1). On this form, solutions to Equation (6) can be obtained using a quantum computer. Table (1) is reproduced below:

TABLE 1

| Constraints | Configurations | Quantum Bits |
|---|---|---|
| None | 65536 | 16 |
| N | 120 | 7 |
| N, $S_z$ | 64 | 6 |
| N, $S_z$, $\Gamma$ | 12 | 4 |
| N, S, $S_z$, $\Gamma$ | 10 | 4 |

Table 1 shows a number of configurations and qubits needed for $F_2$ when various constraints are applied. With a frozen core in the minimal atomic basis, $F_2$ has 8 spatial orbitals, 16 spin orbitals, and 14 electrons (N). The top row represents a standard approach, while the remaining rows represent variants of SCM in accordance with an embodiment of the present disclosure. In an embodiment, we consider the cases when the spin-projection $S_z$ is fixed to 0 and when the spatial symmetry F is fixed to the $A_g$ irreducible representation. In an embodiment, row 4 (with constraints N, $S_z$, F) was used in an exemplary study.

Figure 3:
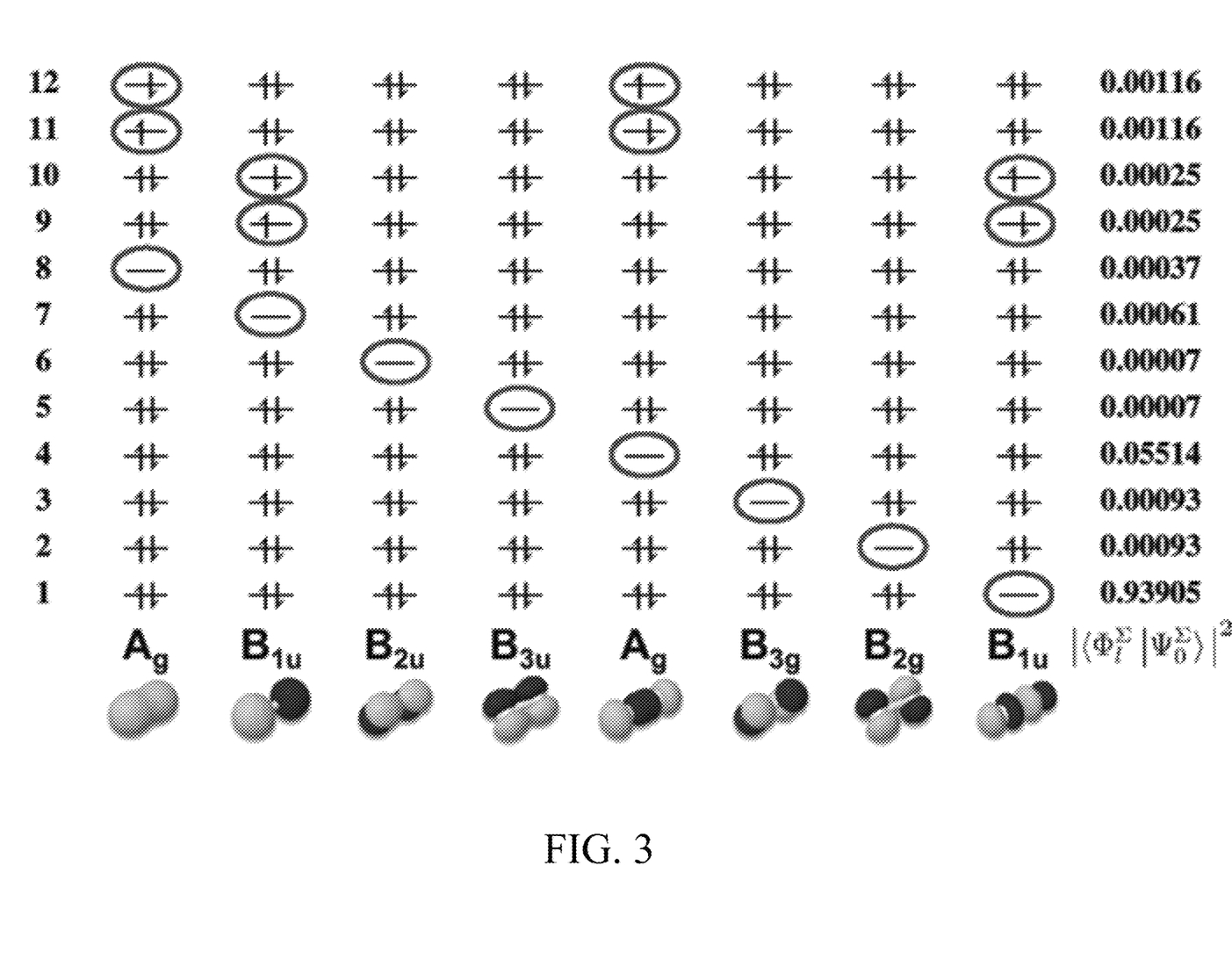
FIG. 3 is a diagram representing the 12 symmetry configuration basis states in the symmetry configuration $\Sigma=(14, 0, A_g)$ in accordance with an embodiment of the present disclosure.

FIG. 3 is a diagram representing the 12 symmetry configuration basis states in the symmetry configuration $\Sigma=(14, 0, A_g)$ in accordance with an embodiment of the present disclosure. In FIG. 3, the valence molecular orbitals of $F_2$ and their irreducible representations are given at the bottom. The numbers in the last column indicate the modulus squared of the overlap of each symmetry configuration basis state with the exact $F_2$ ground state at the equilibrium geometry.

In an embodiment, we demonstrate the SCM method by solving for the ground state of the $F_2$ molecule. $F_2$ has 18 electrons and a minimal basis consisting of 20 spin-orbitals; however, in an embodiment, we have adopted a frozen-core approximation to eliminate 4 electrons and 4 spin-orbitals from the configuration interaction active space (See FIG. 3). In an embodiment, we can construct the symmetry configuration basis states $|\Phi_\ell^\Sigma\rangle$ such that: (1) they are simultaneous eigenstates of the total number operator $\hat{N}$ and the total spin operators $\hat{S}^2$ and $\hat{S}_z$, with quantum numbers N, S, and $S_z$, respectively, and (2) they form a complete basis for the irreducible representation $\Gamma$ of the spatial symmetry group of the system. In an embodiment, this lets us express symmetry configurations as $\Sigma=(N, S, S_z, F)$. In an embodiment of a $F_2$ demonstration however, we exclude total spin S and focus on configurations on the form $\Sigma=(N, S_z, \Gamma)$. Even forgoing S, we have still achieved a four-fold reduction in the required number of qubits, as shown in Table 1.

In an embodiment, there are only twelve symmetry configuration basis states $|\Phi_\ell^{(N,S_z,\Gamma)}\rangle$ for the symmetry configuration of the lowest-energy state, which has $S_z=0$ and the irreducible representation $A_g$ of the $D_{2h}$ point group. These symmetry configuration basis states $|\Phi_\ell^{(14,0,A_g)}\rangle$, illustrated in FIG. 3, can be understood by focusing on hole states describing unoccupied orbitals. In an embodiment, for a basis state to have the appropriate $A_g$ symmetry, the two unoccupied orbitals must belong to the same irreducible representation, which is only satisfied by the twelve states in FIG. 3. Equation (8) tells us that we only need 4 qubits to map these 12 symmetry configuration basis states, instead of the 16 qubits required to map all the 65,536 basis states of the Fock space.

The factor of 4 savings in the number of qubits could also lead to a savings in the number of variation parameters needed. For the hardware-efficient ansatz, the number of parameters scales linearly with the number of qubits. This results in the same relative savings in the number of parameters, at a given algorithm depth, as the number of qubits. Furthermore, it is possible that the more compact representation generated by the SCM method in accordance with an embodiment of the present disclosure could require a shallower algorithm to reach the desired accuracy.

In an embodiment, for the $F_2$ calculations, we used the hardware-efficient algorithm of Kandala et al., which consists of entangling two-qubit operations sandwiched between layers of single qubit operations to prepare our trial states. Specifically, in an embodiment, we used the CNOT gate to entangle the qubits. Kandala et al. used arbitrary single-qubit operations in their implementation of the hardware-efficient ansatz $U^{q,i}(\theta)=R_z(\theta_1^{q,i})R_x(\theta_2^{q,i})R_z(\theta_3^{q,i})$, where q is again a qubit index and i identifies the depth layer of the quantum circuit. With the qubits all initialized in their ground states, the first rotation around the z-axis is inconsequential, and thus, the number of optimization parameters is $D^\Sigma=(3d+2)Q^\Sigma$, where d is the depth of the circuit. In an embodiment, not all of these parameters however, are generally needed as we do not seek arbitrary solutions, but rather particular solutions.

Figure 4A:
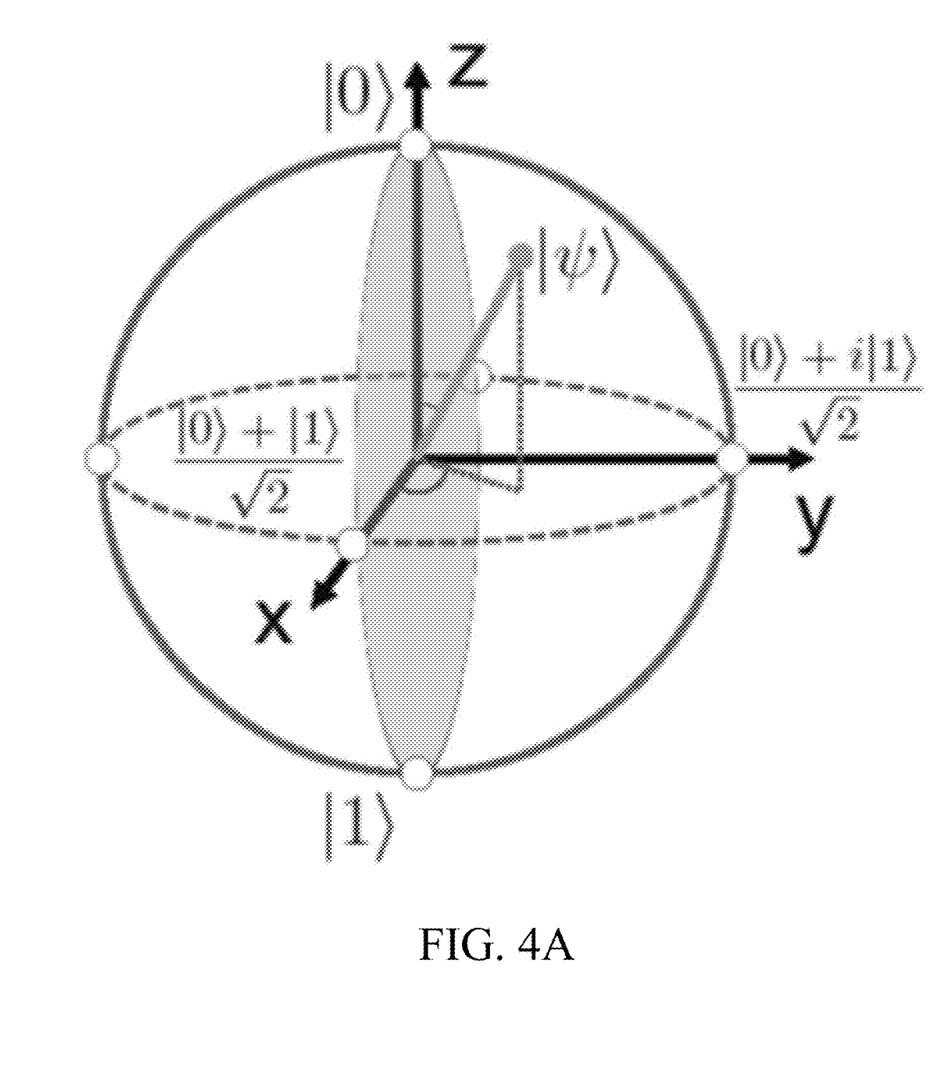
FIG. 4A is a diagram of a Bloch sphere representation of a single-qubit state in accordance with an embodiment of the present disclosure.
Figure 4B:
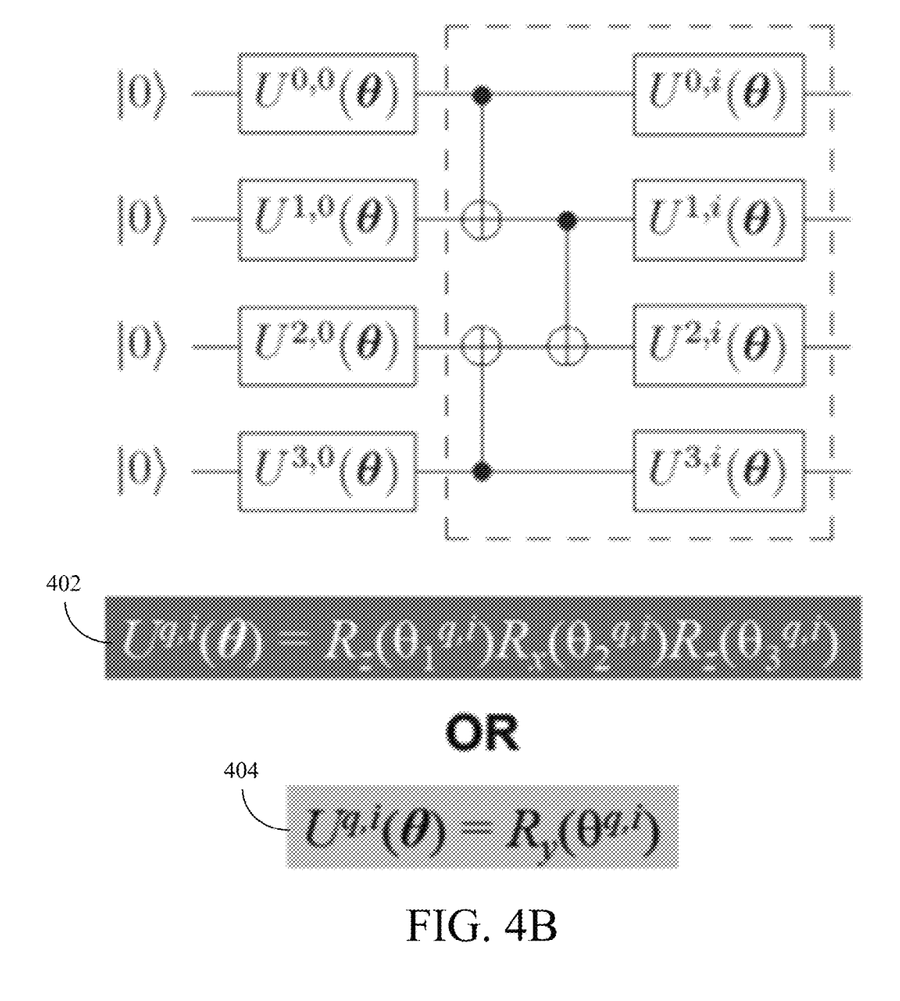
FIG. 4B is a diagram representing a hardware-efficient circuit ansätze in accordance with an embodiment of the present disclosure.

FIG. 4A is a diagram of a Bloch sphere representation of a single-qubit state in accordance with an embodiment of the present disclosure. In FIG. 4A, the state remains real as long as it is confined to the xz-plane, allowing us to restrict our single-qubit rotations to those around the y-axis. FIG. 4B is a diagram representing a hardware-efficient circuit ansätze in accordance with an embodiment of the present disclosure. In FIG. 4B, rotations 402 produce complex trial states, while rotations 404 produce only real trial states.

In an embodiment, for many systems of interest in quantum mechanics, the Hamiltonian contains only real terms. If we have a real Hamiltonian, then the decomposition of the matrix representation of the Hamiltonian can be achieved with real eigenvectors. Because our entangling gate operator has a real representation, we can, without loss of generality, restrict the single-qubits operations to those that leave each qubit state in the real subspace. Visually, we can see in the Bloch sphere representation in FIG. 4A that a qubit state remains real as long as it is confined to the xz-plane. This means that we can restrict our single-qubit operations to $U^{q,i}(\theta)=R_y(\theta^{q,i})$. The number of optimization parameters, and needed single-qubit gates, is then $$D^\Sigma=(d+1)Q^\Sigma, \quad (9)$$

which is nearly a reduction by a factor of 3, in addition to the reduction by a factor of 4 in $Q^\Sigma$, and the fact that d generally decreases with decreasing $Q^\Sigma$.

In an embodiment, through simulation of our quantum circuits, we found no statistically significant differences in the calculated energies or needed algorithm depths, when comparing the arbitrary single-qubit rotations with those that enforce the real-space restriction. Additionally, we found that an algorithm depth of 1 was sufficient to reach an average accuracy of 1.07 kcal/mol across the potential energy curve of $F_2$, with a maximum error of 3.03 kcal/mol. A circuit depth of 2 resulted in the entire curve being calculated to within chemical accuracy (maximum error less than 1 kcal/mol).

Having demonstrated that chemical accuracy with short circuit depth can be achieved with our setup, we now turn to analyze the performance on an actual quantum computer. To this end, we have run experiments on IBM's Poughkeepsie quantum computer. In an embodiment, we used an algorithm depth of 1 to minimize decoherence errors and reduce the buildup of gate errors. To account for measurement errors in our results, we constructed a calibration matrix whose columns correspond to the probability to measure each computational basis state for the preparation of a given computational basis state. This matrix was then inverted and used to correct the measured probabilities for the hardware-efficient ansatz.

Figure 5:
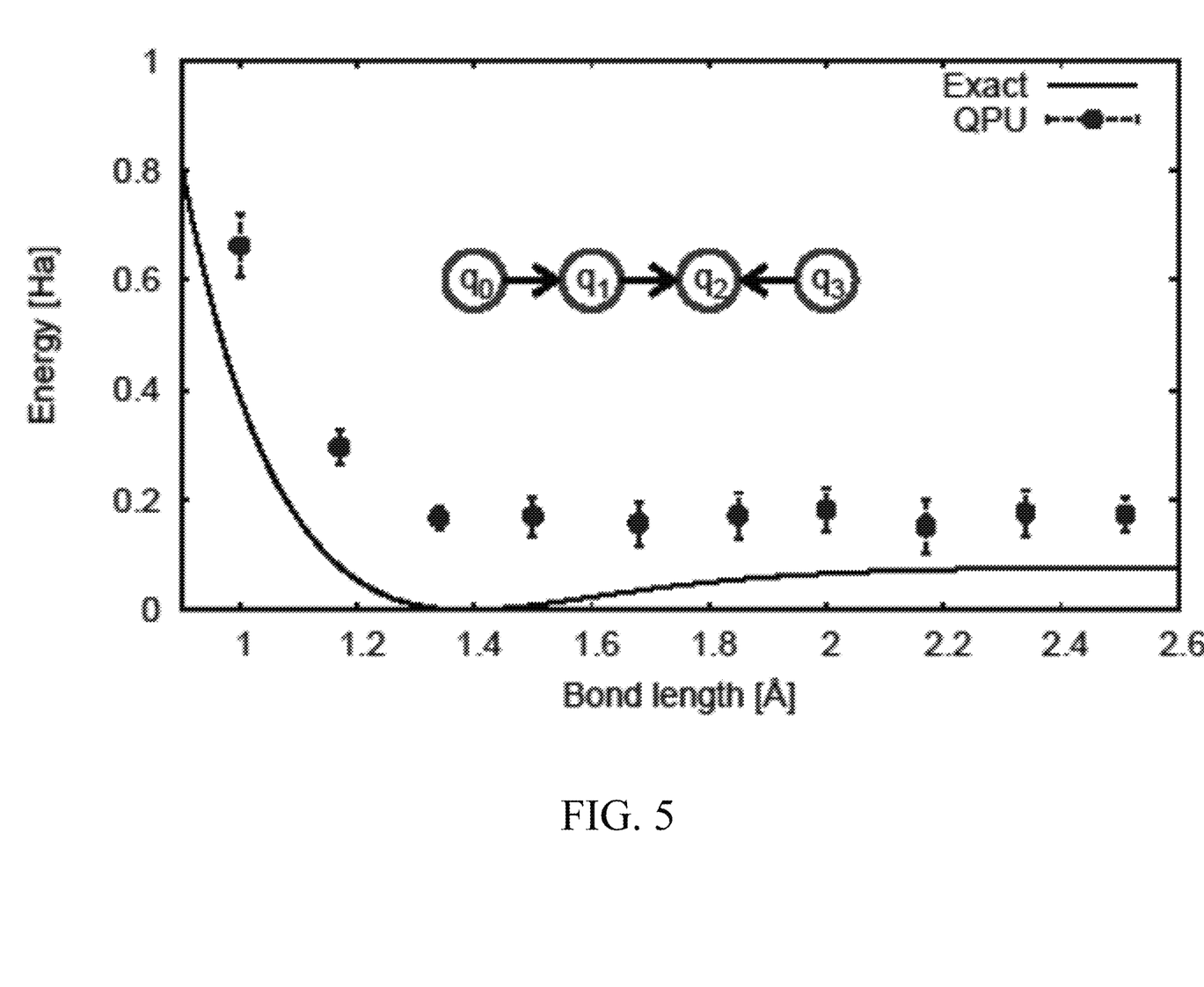
FIG. 5 is a diagram illustrating calculated ground-state energy of molecular fluorine ($F_2$) as a function of bond length in accordance with an embodiment of the present disclosure.

FIG. 5 is a diagram illustrating calculated ground-state energy of $F_2$ as a function of bond length in accordance with an embodiment of the present disclosure. In FIG. 5, The solid line gives the reference FCI result calculated with Psi4. The circles give the energies averaged over the last 25 iterations of the optimization, with the error bars representing the standard deviations of those sets. These results were obtained using the IBM Q Poughkeepsie quantum computer. The inset shows the topology of the utilized qubits with the arrows indicating the employed CNOT gates. All energies are given with respect to the exact result at the equilibrium bond length.

FIG. 5 shows the results of our optimizations on the quantum computer in accordance with an embodiment of the present disclosure. While the ideal simulation gave an average error of 1.07 kcal/mol across the potential energy curve, the actual device results give an average error of 90.9 kcal/mol. This is comparable to the average error of approximately 68 kcal/mol seen previously for the simulation of LiH on 4 qubits. As we have already attempted to correct for readout errors, the remaining errors in the calculated energies relative to the ideal simulation could be attributable to noisy gate operations and decoherence/relaxation errors, which could potentially be mitigated with custom pulse sequences.

In summary, we have described an SCM method in accordance with an embodiment of the present disclosure, which provides compact system-to-qubits mappings saving scarce quantum computing resources. In particular, we demonstrated how this method can be used to achieve a factor of 4 reduction in the number of qubits needed, compared to standard mappings, to solve for the full many-particle ground state of the $F_2$ molecule in a minimal basis with 16 active spin-orbitals. We also showed how systems described by a real Hamiltonian benefit from a hardware-efficient ansatz that only includes single-qubit rotations around the y-axis, reducing the number of single-qubit operations roughly by a factor of three.

As shown above, an SCM method in accordance with an embodiment of the present disclosure could be used to generate compact mappings to address systems several times larger than otherwise possible. If we assume that the development of quantum computing hardware follows a Moore's law with the quantum computing capability doubling every 3 years, say, a four-fold reduction in needed resources would correspond to 6 years of hardware development.

In an embodiment, the FCI Hamiltonian in the basis of configuration states of the $A_g$ irreducible representation of $F_2$ using the STO-3G atomic basis set was obtained from Psi4. This matrix was then decomposed into a sum of tensor products of Pauli operators to give the qubit representations (the qubit Hamiltonians are given in the SI). In an embodiment, all of the quantum computer experiments were run via Qiskit, and the trial state variational parameters were optimized via the simultaneous perturbation stochastic approximation algorithm with method parameters a=1.2, A=20, c=0.06, α=0.602, and γ=0.101. The 132 terms in the qubit Hamiltonians were grouped into 40 tensor product basis states via OpenFermion. For the optimization, 200 iterations were performed and 1,024 shots were used for the energy evaluations at the perturbed parameters at each iteration. The readout error calibration matrix was calculated at the beginning of the optimization, and then every 10 iterations thereafter. In an embodiment, we used 8,192 shots for the construction of the calibration matrix. During the last 25 iterations, the energies at the current parameters were also evaluated, again using 8,192 shots. The reported energies correspond to the average over these last 25 evaluations.

4. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A mapping device, comprising:
   a memory;
   a physical sample receiver configured to receive a physical sample;
   a sensor configured to:
      scan the physical sample, thereby generating scanned information, and
      sense a plurality of particles in the physical sample based on the scanned information, and
   a mapper comprising a controller, wherein the controller is configured to:
      determine, based on the sensed particles, particle composition information and symmetry configuration information of a closed quantum-mechanical system corresponding to the physical sample,
      determine a plurality of quantum-mechanical system representations based on the particle composition information and the symmetry configuration information,
      determine a plurality of symmetry configuration basis states for the plurality of quantum-mechanical system representations,
      determine a mapping between the plurality of symmetry configuration basis states and a plurality of basis states spanning a plurality of computational spaces of a quantum processor, and
      send a signal to a quantum computer, wherein the signal is configured based on the determined mapping, and wherein the quantum computer is configured to change values in quantum registers of the quantum computer in response to receiving the signal.

2. The mapping device of claim 1, wherein the closed quantum-mechanical system is a closed chemical system.

3. The mapping device of claim 1, wherein the closed quantum-mechanical system is a molecular fluorine system.

4. The mapping device of claim 1, wherein the controller is further configured to:
   map the plurality of symmetry configuration basis states to the plurality of basis states spanning the plurality of computational spaces of the quantum processor.

5. The mapping device of claim 4, wherein the controller is further configured to:
   determine a many-particle Hilbert space of the closed quantum-mechanical system; and
   map the many-particle Hilbert space to the plurality of basis states spanning the plurality of computational spaces of the quantum processor.

6. The mapping device of claim 4, wherein the controller is further configured to:
determine a many-particle Hilbert space of the closed quantum-mechanical system; and
determine a symmetry-invariant subspace of the many-particle Hilbert space.

7. The mapping device of claim 1, wherein the controller is further configured to:
determine a plurality of commuting operators comprising a Hamiltonian describing the closed quantum-mechanical system.

8. The mapping device of claim 7, wherein the commuting operators further comprise operators constructed from a plurality of symmetry operators of a symmetry group of the closed quantum-mechanical system.

9. The mapping device of claim 7, wherein the plurality of commuting operators comprises Casmir operators.

10. The mapping device of claim 7, wherein the plurality of commuting operators comprises equivalence class operators.

11. The mapping device of claim 6, wherein the controller is further configured to:
determine a symmetry configuration of interest for the closed quantum-mechanical system.

12. The mapping device of claim 11, wherein the controller is further configured to:
determine the symmetry-invariant subspace based on the symmetry configuration of interest.

13. The mapping device of claim 12, wherein the controller is further configured to:
determine a basis of orthonormal configuration states for the symmetry-invariant subspace; and
determine a plurality of Hamiltonian matrix elements using the basis of orthonormal configuration states.

14. The mapping device of claim 13, wherein the controller is further configured to:
determine a plurality of Pauli coordinates based on the plurality of Hamiltonian matrix elements.

15. A system, comprising:
a mapping device, comprising:
a memory,
a sensor configured to:
receive a physical sample,
sense a plurality of particles in the physical sample, and
determine, based on the sensed particles, particle composition information and symmetry configuration information of a closed quantum-mechanical system corresponding to the physical sample, and
a controller configured to:
determine a quantum-mechanical system representation based on the particle composition information and the symmetry configuration information,
determine a symmetry-adapted representation of the quantum-mechanical system representation,
determine a quantum processor representation of the symmetry-adapted representation, and
send a signal based on the quantum processor representation; and
a quantum computer comprising a plurality of quantum registers, wherein the quantum computer is configured to:
receive the signal, and
change values in the quantum registers based on the determined quantum processor representation.

16. A method for determining a mapping of a closed chemical system to a plurality of registers of a quantum processor, the method comprising:
receiving, using a sensing device, a physical sample;
scanning, using the sensing device, the physical sample;
sensing, using the sensing device, a plurality of particles in the physical sample based on the scanned information;
determining, using a controller device and based on the sensed particles, particle composition information and symmetry configuration information of a closed quantum-mechanical system corresponding to the physical sample;
determining, using the controller device, a quantum-mechanical system representation based on the particle composition information and the symmetry configuration information;
determining, using the controller device, a symmetry-adapted representation of the quantum-mechanical system representation;
determining, using the controller device, a quantum processor representation of the symmetry-adapted representation; and
sending, using the controller device, a signal to a quantum computer, wherein the signal is configured based on the quantum processor representation, and wherein the quantum computer is configured to change values in quantum registers of the quantum computer in response to receiving the signal.

17. The method of claim 16, further comprising:
mapping the quantum processor representation to the plurality of registers of the quantum processor, wherein each register in the plurality of registers holds a plurality of quantum bits.

18. The method of claim 16, further comprising:
determining a many-particle Hilbert space of the closed quantum-mechanical system; and
determining a symmetry-invariant subspace of the many-particle Hilbert space.

19. The method of claim 18, further comprising:
determining a symmetry configuration of interest for the closed quantum-mechanical system; and
determining the symmetry-invariant subspace based on the symmetry configuration of interest.

20. The method of claim 19, further comprising:
determining a basis of orthonormal configuration states for the symmetry-invariant subspace;
determining a plurality of Hamiltonian matrix elements using the basis of orthonormal configuration states; and
determining a plurality of Pauli coordinates based on the plurality of Hamiltonian matrix elements.

\* \* \* \* \*